United States Patent
Tithecott

(10) Patent No.: US 10,317,176 B2
(45) Date of Patent: Jun. 11, 2019

(54) DECOY

(71) Applicant: Leonardo MW Ltd, Basildon (GB)

(72) Inventor: Geoff Tithecott, Basildon (GB)

(73) Assignee: LEONARDO MW LTD, Basildon, Essex (GB)

( * ) Notice: Subject to any disclaimer, the term of this patent is extended or adjusted under 35 U.S.C. 154(b) by 608 days.

(21) Appl. No.: 14/904,351

(22) PCT Filed: Jun. 25, 2014

(86) PCT No.: PCT/EP2014/063411
§ 371 (c)(1),
(2) Date: Jan. 11, 2016

(87) PCT Pub. No.: WO2015/003907
PCT Pub. Date: Jan. 15, 2015

(65) Prior Publication Data
US 2016/0146580 A1    May 26, 2016

(30) Foreign Application Priority Data

Jul. 10, 2013   (GB) .................................. 1312401.1

(51) Int. Cl.
*F41H 11/02* (2006.01)
*G01S 7/38* (2006.01)
*F42B 12/36* (2006.01)

(52) U.S. Cl.
CPC ............ *F41H 11/02* (2013.01); *F42B 12/365* (2013.01); *G01S 7/38* (2013.01)

(58) Field of Classification Search
CPC .................................... G01S 7/38; F41H 11/02
(Continued)

(56) References Cited

U.S. PATENT DOCUMENTS 5,548,839 A * 8/1996 Caldwell ................ H03D 7/161
455/303
7,081,846 B1 * 7/2006 Sparrow .................... G01S 7/38
342/14
(Continued)

OTHER PUBLICATIONS

International Search Report (PCT/ISA/210) dated Sep. 15, 2014, by the European Patent Office as the International Searching Authority for International Application No. PCT/EP2014/063411.
(Continued)

*Primary Examiner* — Peter M Bythrow
*Assistant Examiner* — Helena H Seraydaryan
(74) *Attorney, Agent, or Firm* — Buchanan Ingersoll & Rooney PC

(57) ABSTRACT

Modern military aircraft are prime targets for surface to air and air to air RF guided missiles. Modern missile systems in particular are difficult to counter and have an array of Electronic Protection Measures at their disposal. Expendable Active Decoys provide effective protection for fast jet platforms by creating a realistic false target that seduces the missile away from the protected platform. They can be fitted to almost all military platforms as they are expended from standard chaff and flare dispensers. Simple repeater devices have been produced in the past but they lack the sophistication to defeat modern threats. Digital RF Memory based jammers have the necessary capability but have always been too large due to their complexity. A system architecture, design features and technologies are disclosed to reduce the size of a Digital RF Memory 12 based jammer to fit within a volume 0.5 l.

19 Claims, 3 Drawing Sheets

(58) Field of Classification Search
USPC .......................................................... 342/14
See application file for complete search history.

(56) References Cited

U.S. PATENT DOCUMENTS

| | | | | |
|---|---|---|---|---|
| 8,049,656 | B2* | 11/2011 | Shani | G01S 7/021 342/13 |
| 2003/0068981 | A1* | 4/2003 | Duthie | F41J 2/00 455/67.11 |
| 2007/0018033 | A1* | 1/2007 | Fanucci | F42B 10/143 244/3.27 |
| 2008/0198060 | A1 | 8/2008 | Shani et al. | |
| 2014/0009319 | A1* | 1/2014 | Geswender | F41H 11/02 342/5 |

OTHER PUBLICATIONS

Written Opinion (PCT/ISA/237) dated Sep. 15, 2014, by the European Patent Office as the International Searching Authority for International Application No. PCT/EP2014/063411.

* cited by examiner

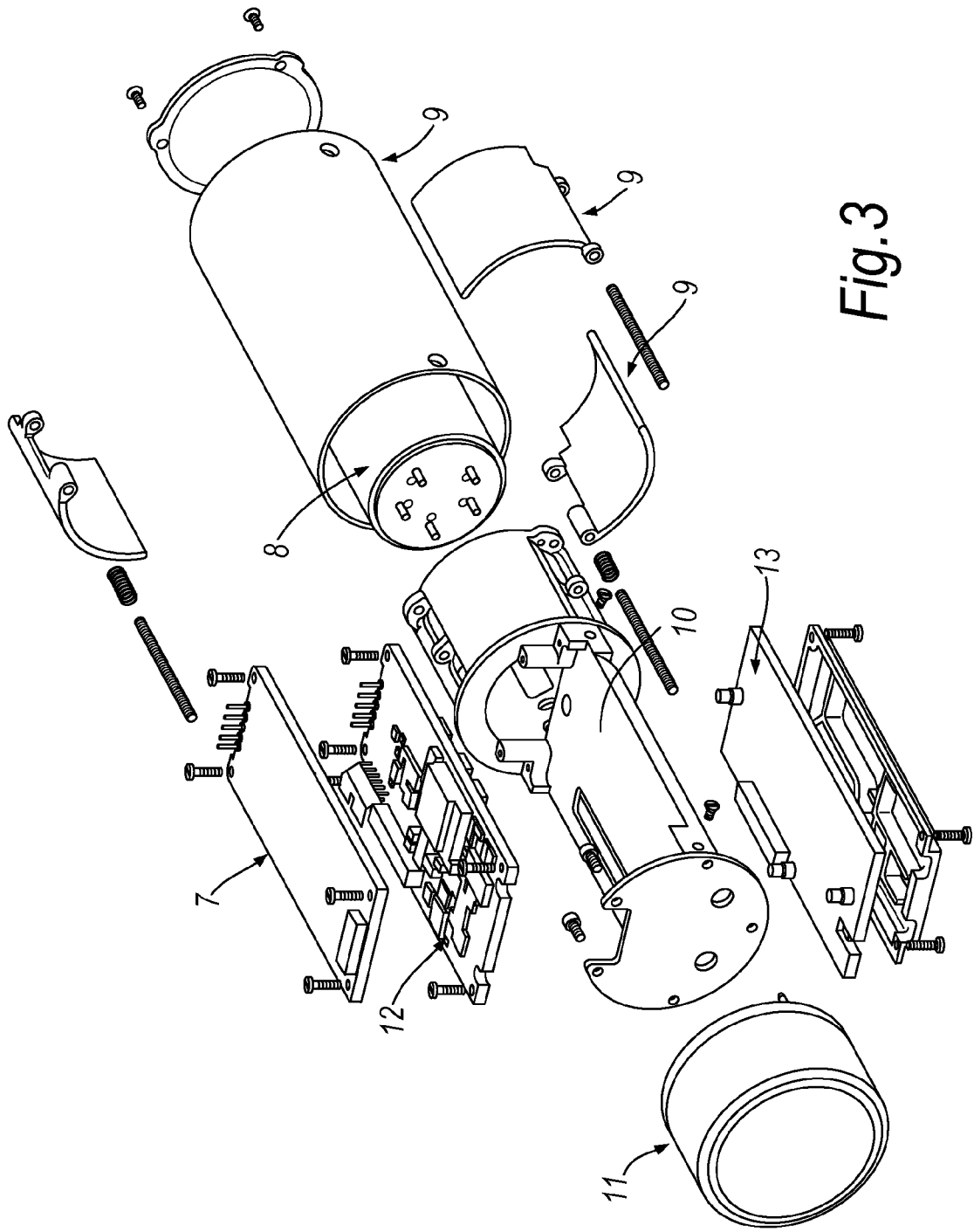

DECOY

The invention relates to a decoy. More specifically, but not exclusively, it relates to a decoy for protecting aircraft platforms against radar-based threats.

Modern military aircraft are prime targets for surface-to-air and air-to-air Radio Frequency (RF) guided missiles. Mobile surface to air missiles with highly accurate RF tracking systems present a formidable threat when used in pop-up mode and many older systems have been retro-fitted with modern electronics that have greatly enhanced their capabilities. The modern systems in particular are difficult to counter and have an array of Electronic Protection Measures (EPM) at their disposal. The technique of off-board jamming gives a robust Electronic Countermeasure (ECM) capability seducing the missiles away from the platform.

Expendable Active Decoys (EAD) may provide effective protection for fast jet platforms. The principle of EADs is that they can be used as a seduction device. EADs can be combined with manoeuvre and chaff deployment to further confuse the victim radar. They are may be supplied in an expendable chaff/flare cartridge that can be fitted to virtually all military aircraft thereby minimising platform integration costs.

The first operational EAD was the Primed Oscillator Expendable Transponder (POET) developed by the US and first produced in 1978. This device evolved to become the Generic Expendable Decoy (GEN-X) which was developed in the mid to late 1980's. Due to the technology available at the time these devices had limited capability.

During the late 1980s the Towed Radar Decoy (TRD) was developed. These provide higher jammer powers and have much greater capability because the jamming waveform is generated by a large and complex Digital RF Memory (DRFM) based jammer on-board the aircraft. The jamming signal is then fed to the decoy via an optical fibre in the tow cable. This has been the preferred active off board ECM solution for the last 20 years.

More recently a system disclosed in U.S. Pat. No. 8,049,656 B2 has been proposed. This decoy provides no Doppler compensation or pulse tracking/prediction to ensure that it is able to produce the obscuration waveform in range and Doppler that is essential for a device of this type. Furthermore, the described decoy does not store sensitive data separately to the dispensed payload which presents a security risk that cannot be overcome easily by erasure and self-destruction.

The present invention aims to overcome the limitations of these devices.

According to the invention there is provided a decoy for protecting a platform against radar-based threats, the decoy comprising an ejectable unit, ejectable from a launch tube on the platform, the ejectable unit comprising memory means having predetermined information loaded thereon relating to potential threats, the unit further comprising an antenna for receiving and transmitting RF signals; signal processing means for processing received RF signals; and comparing means for comparing the processed signals with the predetermined information and determining presence of a threat, in which the signal processing means on determining a threat transmits an altered RF signal via the antenna such that the received signal is jammed and the threat is lured away from the platform.

The approach described here, together with advances in technology, have made possible a complex Digital RF Memory (DRFM) based jammer that fits within a volume of 0.5 l making a new generation of expendable active decoys viable.

The invention will now be described with reference to the accompanying diagrammatic drawings in which:

FIG. 3 is a schematic 3-dimensional exploded view of a decoy in accordance with one form of the invention.

Figure 1:
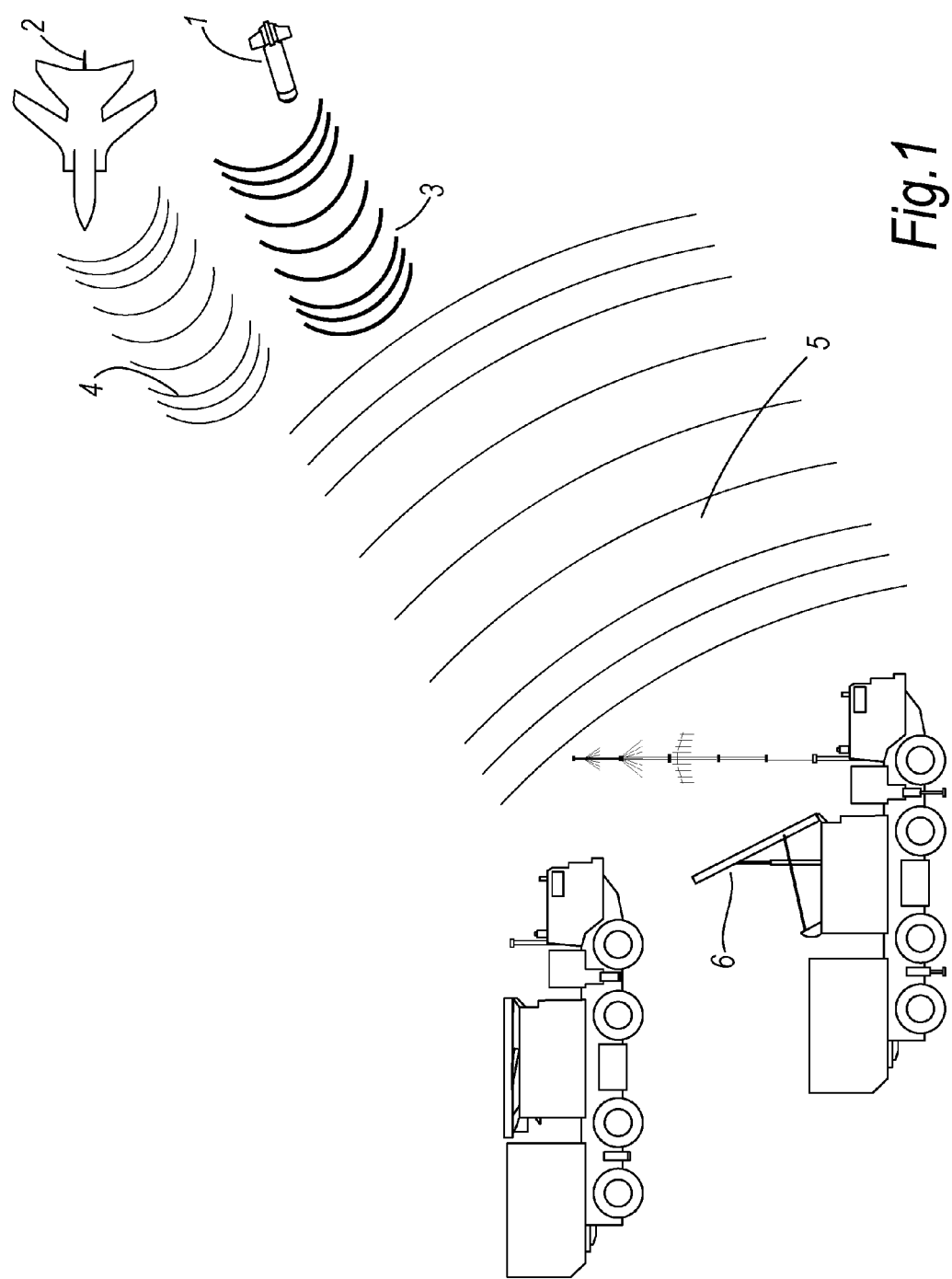
FIG. 1 is a schematic diagram showing an EAD, in accordance with one form of the invention, being deployed from a platform and jamming an incoming missile threat.
Figure 2:
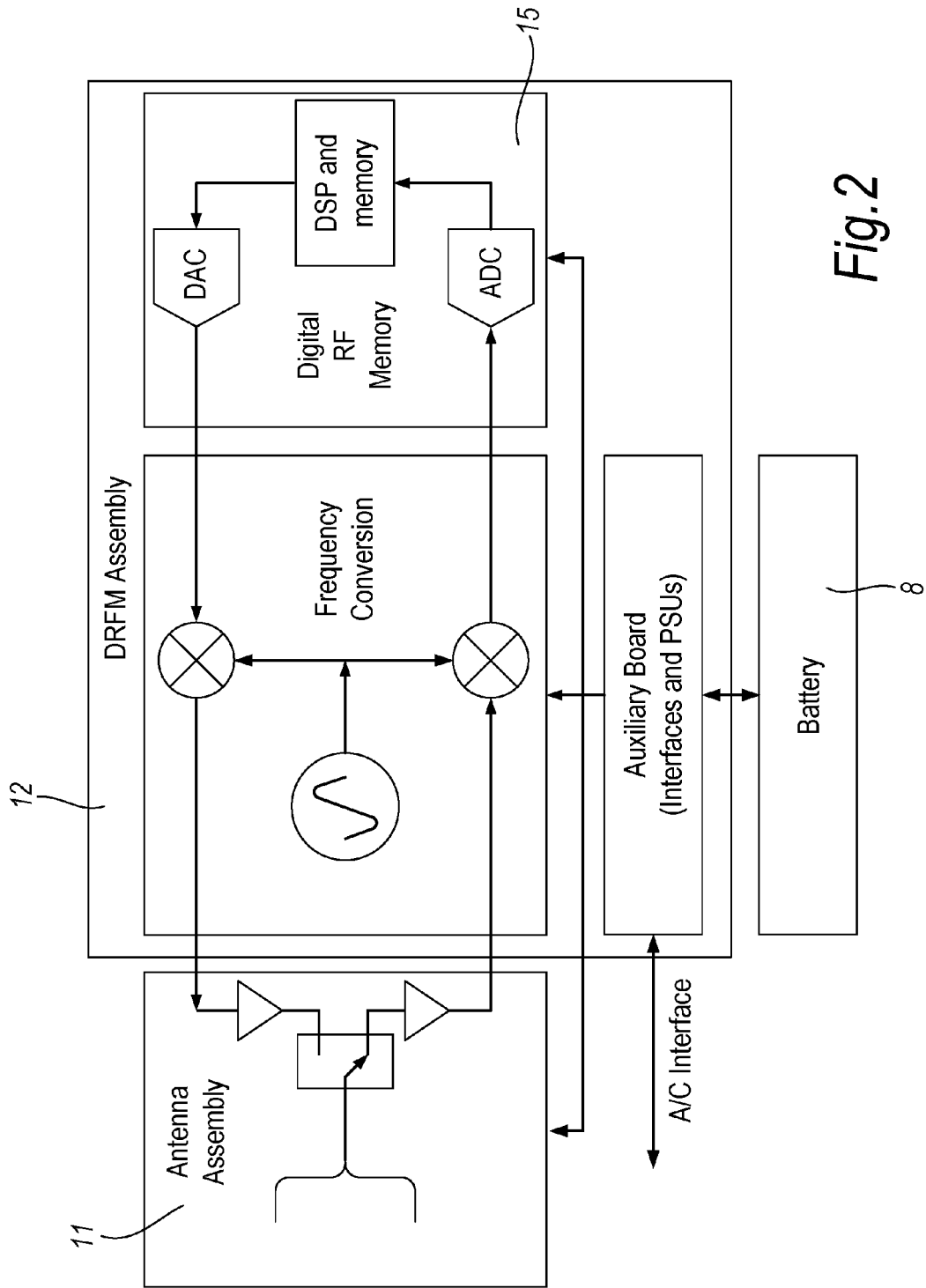
FIG. 2 is a schematic block diagram of an EAD in accordance with one form of the invention.

The RF decoy in accordance with one form of the invention comprises an ejectable unit 1 and a launch tube (not shown) from which the unit 1 may be ejected. The ejectable unit 1 comprises a stand-alone system that includes a receiver and transmitter 11, a digital RF memory (DRFM) 12, a power source 8 and one or more onmidirectional EW antennas, all of which operate independently of the equipment residing in the protected platform 2 itself. In the example described below, the platform to be protected is an aircraft 2. However, it will be appreciated that any suitable platform may be protected in this way.

In use the launch tube is programmed with a Pre Flight Message (PFM) before being fitted to the aircraft 2. The PFM contains information on the parameters of the threat systems 5 that it might encounter and the jamming waveforms 3 to be used against these possible threats 5. During operations, threats will first be detected by the on-board Radar Warning Receiver which alerts the aircrew. Once a threat presence and bearing are detected and confirmed the aircrew will manoeuvre the aircraft 2 to provide the best aspect to the threat 6 for decoy operation. Once commanded to launch, but immediately prior to launch, the EAD 1 starts its own internal battery 8 and loads the PFM from non-volatile memory (NVM), in which it is stored in the launch tube, into volatile, random access memory (RAM) on board the ejectable unit 1. The PFM is held within the launch tube, which remains within the aircraft 2, to ensure that the ejectable unit 1 does not permanently hold any sensitive information. Hence any unsecured, sensitive data in the launch tube returns to base with the aircraft 2. The temporary copy held in RAM in the decoy is lost when the battery dies. It will be appreciated that the data stored in the RAM in the ejectable unit 1 may be automatically deleted prior to battery 8 power becoming depleted as a precautionary measure.

The ejectable unit 1 is then launched and automatically generates the correct waveform 3 to decoy the threat. As the ejectable unit 1 falls away from the aircraft the threat system 5 will follow, thereby protecting the aircraft 2.

Following ejection, the unit 1 runs a search strategy controlled by data loaded from the PFM. The search strategy uses priorities to scan for threat systems 5 in an efficient manner. As it scans, it measures received signals 5 and decides if they match those of a threat system 6. When a match is identified the appropriate jamming waveform 3 is selected from the PFM. A typical approach is to produce an obscuration waveform 3 at maximum power that coincides with the skin echo from the aircraft 2 in both time (range) and frequency. The waveform 3 employed compensates for the motion of the aircraft 2 and decoy to present the most realistic signature 3 to the threat 6 possible.

The ejectable unit comprises 5 main sub-assemblies:
Integrated Transmit Receive (TR) assembly 11
Single board DRFM with DSP and processor 12
Single board frequency conversion 13
Power and initialisation sub-system 8
Flight body and chassis 9, 10

With regard to the flight body 9 and chassis 10, the airborne RF decoy has the mechanical outline of standard chaff and flare decoys to enable it to be safely ejected from any platform 2 by pyrotechnic elements. It is compatible with all existing industry dispensers so that no structural or aerodynamical changes are required to the aircraft 2 or platform and the operational deployment process is straight forward, that is, identical to the process of ejecting chaff or a flare.

A number of emerging capabilities are employed to minimise the volume. The TR assembly 11 uses Monolithic Microwave Integrated Circuits (MMIC) incorporating High Power Amplifier (HPA), Low Noise Amplifier (LNA) and Transmit Receive switching arrangement. Third Nyquist sampling and signal regeneration is implemented in the DRFM sub assembly. This use of third Nyquist sampling and signal regeneration allows frequency conversion to be simplified to single stage down-conversion scheme. Furthermore, the implementation and use of field programmable gate array (FPGA) technologies provides for small devices with very high gate counts. This allows complex Digital Signal Processing (DSP) to be integrated with a very capable processing core. A single chip solution for both software and DSP enabled the DRFM 12 size to be minimised.

The TR assembly 11 comprises an antenna and an integrated TR module that has multiple TR MMICs. Multiple devices are used to drive a multi feed antenna and to achieve the transmit power. The MMICs contain HPAs, LNAs and Transmit/Receive switching circuitry. The coupling scheme used provides Broadband, high power switching whilst maintaining fast switching times and low loss.

The antenna is designed to provide a near spherical coverage and can incorporate a polariser to provide a good match to the antenna of the threat systems. The present invention can also incorporate alternative antenna designs that shape the antenna radiation pattern to maximise the effectiveness of the deceiving signal.

The DRFM 12 processes digitised signals to derive the parameters of the signal such as frequency, pulse width and Pulse Repetition Interval (PRI). The measured parameters are used to identify threat signals 5. Threat signals 5 are continuously monitored to ensure that receive/transmit timing, frequency and gain are correctly controlled. The DRFM 12 stores a digitised radar waveform and then replays the signal with modified characteristics. The jamming signal 3 is generated digitally based on the PFM data.

The DRFM 12 uses a single Analogue to Digital (ADC) and Digital to Analogue (DAC) Converter. The single signal processing device contains parameter measurement, signal storage, signal modification circuits and houses the processor that runs the search strategy and selects the jamming waveforms 3. In essence, a priority based search algorithm is run, that is capable of detecting threats.

The Frequency Converter 13 translates the real world signals into the intermediate frequency required by the DRFM 12. It provides conditioning of the signals in terms of bandwidth limiting and amplitude control under the control of the DRFM. The present design uses suspended strip line filters which are buried within the printed circuit board to reduce the size of the design.

A thermal battery 8 is the power source for the ejectable unit 1. Various lithium chemistries are possible alternatives as these provide higher energy densities, are lighter and are easier to package. An auxiliary board regulates the battery to produce the other voltage rails. The auxiliary board also has a micro controller which handles interfaces PFM load and start up sequencing.

It is important that after ejection the ejectable unit 1 orientates itself correctly. This is to ensure that the antenna is kept pointing at the threat and that the automatic jamming technique compensation works correctly. The design therefore has to meet basic aerodynamic requirements including correct positioning of Centre of Gravity and Centre of Pressure. The erectable fin structure 9 with locking mechanism and nose mass within the antenna achieve this. Preferably there are 3 spring loaded fins including a locking mechanism. The mechanical design incorporates the antenna and battery 8 as integral parts of the mechanical structure.

It will be appreciated that the ejectable unit 1 contains pulse trackers to maintain track and allow up range jamming. Furthermore, the unit 1 may automatically compensate using the Doppler Effect for aircraft-decoy velocity differences. Other advantages of the present invention include the retention of PFM data in launch tube to ensure classified data cannot be compromised; wideband operation (greater than 1 octave) through the use of tuneable oscillator and multiple filters; the use of Built In Test (BIT) circuitry to allow end to end testing prior to the mission.

It will further be appreciated that the ejectable unit 1 of the present invention is a high power device incorporating a shaped antenna radiation pattern to maximise effectiveness of deceiving signal. Moreover, the EAD may power up before ejection from the aircraft 2 to allow for PFM and aircraft data to be loaded or may power up after ejection, the data being loaded via a short range wireless upload link.

In the present invention it is envisaged that all modulation is applied digitally and a large total dynamic range is achieved through use of switched attenuators.

As described above, the present invention provides an airborne RF decoy that provides protection against whilst overcoming the above-mentioned limitations. The decoy is capable of operation off-board and independently of the military platform, such as an aircraft 2, that it is designed to protect. In this way, the decoy can cause enemy attacking missiles to explode at a sufficiently large distance from the aircraft 2, thereby protecting the aircraft 2 and any crew.

The airborne RF decoy may cope with multiple threats 6 coming from any direction, hence its applicability to protection of aircraft 2. However, any military platform in need of such protection may be protected in this way.

The decoy does not need knowledge of the technical details of all of the likely threats, only those likely to be a threat at a given time in a given location may be uploaded to the decoy prior to use. Accordingly, this provides a robust ECM solution.

The airborne RF decoy of the invention is an expendable, stand-alone, off-board Electronic Counter-Measure (ECM) system aimed to provide airborne platforms with protection against multiple radar-based threats including Air-to-Air (AA) and Surface-to-Air (SAM) missiles both active and semi-active ones. However, it will be appreciated that the decoy may be used to protect against other potential threats as deemed necessary.

The invention claimed is:

1. A decoy for protecting a platform against radar-based threats, the decoy comprising:
    a launch tube and an ejectable unit from the launch tube on the platform, the ejectable unit containing:
    memory means having predetermined information loaded thereon relating to potential threats,
    the unit further containing an antenna for receiving and transmitting RF signals;
    signal processing means for processing received RF signals; and comparing means for comparing the processed signals with the predetermined information and for determining presence of a threat, in which the signal processing means on determining a threat transmits an altered RF signal via the antenna such that the received signal is jammed and the threat is lured away from the platform, wherein the predetermined information resides in non-volatile memory means in the launch tube, the predetermined information being uploaded to random access memory means in the ejectable unit immediately prior to ejection of the ejectable unit from the launch tube.

2. A decoy according to claim 1 configured such that the predetermined information will be deleted from the random access memory means on removal of power from the ejectable unit.

3. A decoy according to claim 1 in which the ejectable unit comprises: an antenna configured for receiving RF signals from multiple directions at any given time after ejection from the platform.

4. A decoy according to claim 1 in which the ejectable unit further comprises: pulse trackers to maintain track and allow up range jamming of the threat.

5. A decoy according to claim 1 in which the memory means comprises: digital RF memory (DRFM).

6. A decoy according to claim 5, in which the DRFM incorporates third Nyquist sampling and signal regeneration thereby allowing frequency conversion to be simplified from a double to single stage down-conversion scheme.

7. A decoy according to claim 1 in which the signal processing means comprises: a priority based search algorithm for detecting threats.

8. A decoy according to claim 1 in which the signal processing means is configured to automatically compensate for any velocity differences between an aircraft and the ejectable unit.

9. A decoy according to claim 1 in which the signal processing means comprises: a tuneable oscillator and multiple filters for enabling wideband operation.

10. A decoy according to claim 1 in which the signal processing means comprises: a series of switched attenuators for providing an enhanced total dynamic range.

11. A decoy according to claim 1 in which a shaped antenna radiation pattern is employed for to maximising effectiveness of the transmitted altered RF signal.

12. A decoy according to claim 1 in which the signal processing means comprises: BIT circuitry to allow end to end testing prior to a mission.

13. A decoy according to claim 1 in which the ejectable unit comprises: a nose mass and erectable fin structures, deployable after ejection from the platform, the fin structures having a locking mechanism for correct positioning of the decoy with respect to a threat location.

14. A decoy according to claim 13 in which the ejectable unit comprises: three spring loaded fin structures including a locking mechanism.

15. A decoy according to claim 1 in which the ejectable unit is powered via an independent power supply.

16. A decoy according to claim 15 in which the independent power supply comprises: at least one thermal battery.

17. A decoy according to claim 1 in combination with a platform which is a fixed or rotary winged aircraft.

18. A decoy according to claim 2 in which the ejectable unit comprises: an antenna configured for receiving RF signals from multiple directions at any given time after ejection from the platform.

19. A decoy according to claim 18 in which the ejectable unit further comprises: pulse trackers to maintain track and allow up range jamming of the threat.

* * * * *